United States Patent
Wu

(10) Patent No.: US 9,196,259 B2
(45) Date of Patent: Nov. 24, 2015

(54) ELECTRONIC DEVICE AND COPYRIGHT PROTECTION METHOD OF AUDIO DATA THEREOF

(75) Inventor: Chun-Te Wu, Tu-Cheng (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 1181 days.

(21) Appl. No.: 13/080,669

(22) Filed: Apr. 6, 2011

(65) Prior Publication Data
US 2012/0185069 A1 Jul. 19, 2012

(30) Foreign Application Priority Data

Jan. 17, 2011 (CN) .......................... 2011 1 0009347

(51) Int. Cl.
*G10L 19/018* (2013.01)
*G11B 20/00* (2006.01)
*G10L 19/008* (2013.01)

(52) U.S. Cl.
CPC .............. *G10L 19/018* (2013.01); *G10L 19/008* (2013.01); *G11B 20/00891* (2013.01)

(58) Field of Classification Search
CPC ................ G10L 19/018; G10L 19/008; G11B 20/00891
USPC .......................... 700/94; 381/7; 375/130, 146
See application file for complete search history.

(56) References Cited

U.S. PATENT DOCUMENTS

| 6,696,989 B2 | 2/2004 | Katayama et al. |
| 7,802,101 B2* | 9/2010 | Johnston et al. ............... 713/176 |
| 2004/0005064 A1* | 1/2004 | Griesinger ........................ 381/17 |
| 2006/0236333 A1 | 10/2006 | Fujikawa et al. |
| 2009/0185692 A1* | 7/2009 | Johnston et al. ............... 380/287 |

FOREIGN PATENT DOCUMENTS

| CN | 1529246 | 9/2004 |
| CN | 101521011 | 9/2011 |
| TW | 395130 | 6/2000 |
| TW | 509894 | 11/2002 |
| WO | 0229808 | 4/2002 |
| WO | WO 00/30101 | 5/2005 |
| WO | 2009107054 | 9/2009 |

OTHER PUBLICATIONS

2000 IEEE InterNatioNal Conference on MultiMedia and Expo ICME2000, Proceedings, vol. 111—Wednesday, Jul. 30-Aug. 2, 2000, New York, NY USA.

(Continued)

*Primary Examiner* — Fan Tsang
*Assistant Examiner* — Eugene Zhao
(74) *Attorney, Agent, or Firm* — Novak Druce Connolly Bove + Quigg LLP

(57) ABSTRACT

A copyright protection method of audio data applied to an electronic device. Left and right channel audio signal values are retrieved from audio signals of an audio source. Enveloping difference values between each left channel audio signal and each right channel audio signal are calculated to determine a time slot. The left channel audio signals and the right channel audio signals respectively modulated, thereby writing digital copyright information in corresponding positions of the time slot according to the modulation.

18 Claims, 25 Drawing Sheets

(56) References Cited

OTHER PUBLICATIONS

Proceedings IEEE Southeastco 'N97, Apr. 12-14, 1997, Virginia Tech, Blacksburg, Virginia, USA, "Engineering the New Century", IEEE Region 3, IEEE Virginia Mountain Section.

Iliev A.I. et al, "Multi level high capacity data hiding technique for stereo audio", Signals, Systems and Computers, 2004, Conference Record of the Thirty-Eighth Asilomar Conference on Pacific Grove, CA, USA Nov. 7-10, 2004, Piscataway, NJ, USA, IEEE, vol. 2, Nov. 7, 2004, pp. 1793-1797, XP010781403, DOI: 10.1109/ACSSC.2994. 1399471.

* cited by examiner

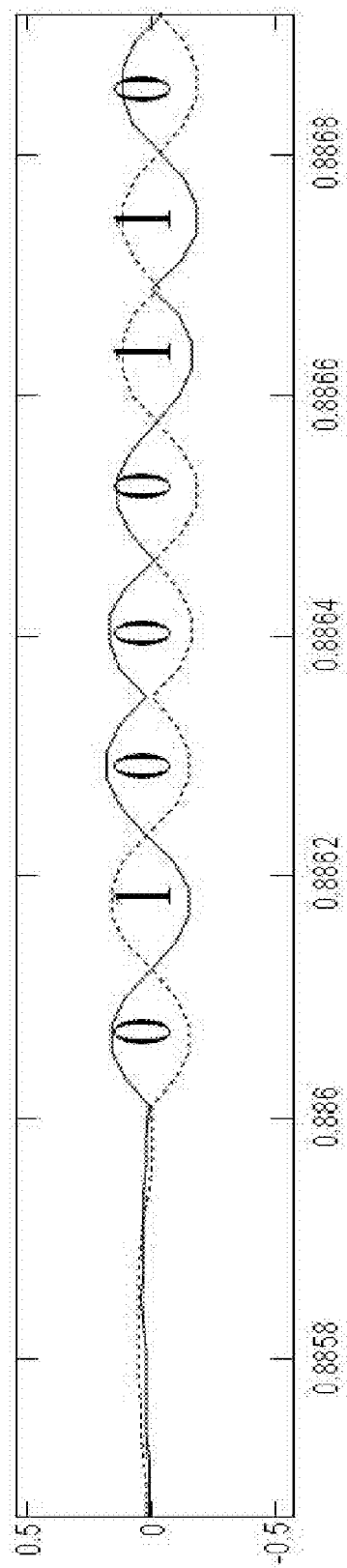

ELECTRONIC DEVICE AND COPYRIGHT PROTECTION METHOD OF AUDIO DATA THEREOF

BACKGROUND

1. Technical Field

The present disclosure relates to security of multimedia information, and more particularly to an electronic device and copyright protection method of audio data thereof.

2. Description of Related Art

Copyright protection and ownership verification are important aspects of multimedia creation. Digital copyright protection technology often involves digital watermarking, in which copyright information are embedded into multimedia works in the form of analog audio signals in a way that is difficult to remove. One of the most secure audio watermarking techniques is spread spectrum audio watermarking (SSW). SSW hides copyright information by spreading the spectrum of the watermark and adding it to a host signal as a watermarked signal. Spectrum is spread by a pseudo-noise (PN) sequence.

However, if the watermarked audio files are infringed upon, automatic identification of the perpetrator is difficult or impossible, therefore the audio files with watermarking technology are hard to track. Thus, the protection of the audio files is less than effective.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIGS. 9A to 9E are exemplary views respectively showing audio signals with inserted digital copyright information modulated by different degrees of an amplitude in accordance with the present disclosure, where FIG. 9A shows original left and right channel audio signals.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

An embodiment of the copyright information protection method of audio data of the present disclosure detects difference between enveloping values of audio signals in a left channel and that in a right channel and inserts digital copyright information in left and right channel audio signals. In addition, the inserted digital copyright information makes phases of the left and right channel audio signals reverse to enhance the difference between the left and right channels.

Figure 1:
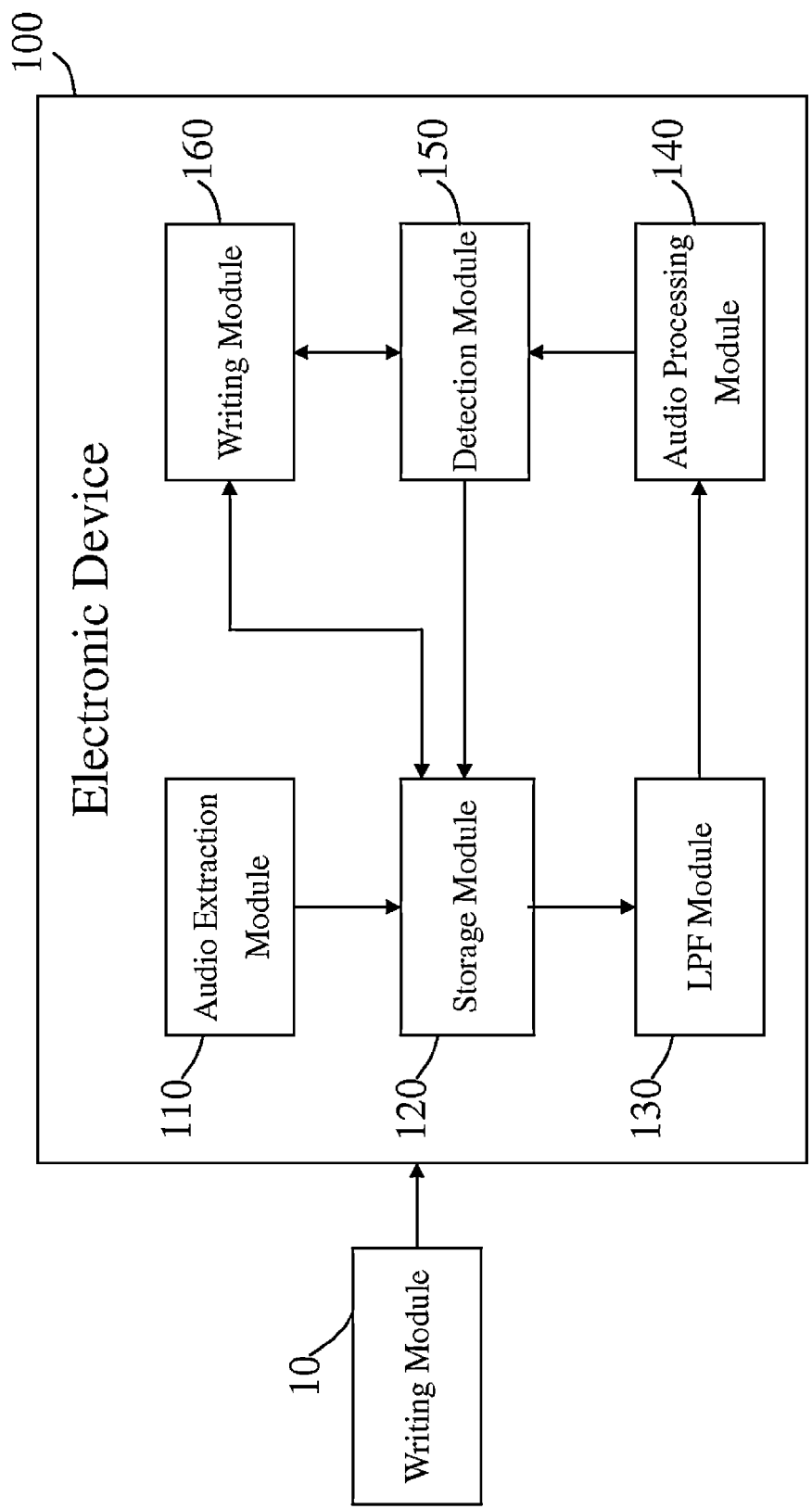
FIG. 1 is a block diagram of one embodiment of an electronic device in accordance with the present disclosure.

FIG. 1 is a block diagram of one embodiment of an electronic device 100 in accordance with the present disclosure.

In an embodiment, the electronic device 100 embeds digital copyright information in audio data. In an embodiment, the electronic device 100 may be a set-top box (STB) and the digital copyright information may be a serial number of the electronic device 100 or a unique serial number of the set-top box, for example.

In an embodiment, the digital copyright information (e.g. the serial number) is a binary number including a plurality of bits, each bit of the binary number representing a symbol, each of the same time length.

In an embodiment, the electronic device 100 includes an audio extraction module 110, a storage module 120, a low pass filter (LPF) module 130, an audio processing module 140, a detection module 150 and a writing module 160.

The modules 110, 120, 130, 140, 150 and 160 may comprise computerized code in the form of one or more programs that are stored in the storage module 120. The computerized code includes instructions that are executed by the at least one processor (not shown) of the electronic device 100 to provide functions for the modules 110, 120, 130, 140, 150 and 160.

Figure 3A:
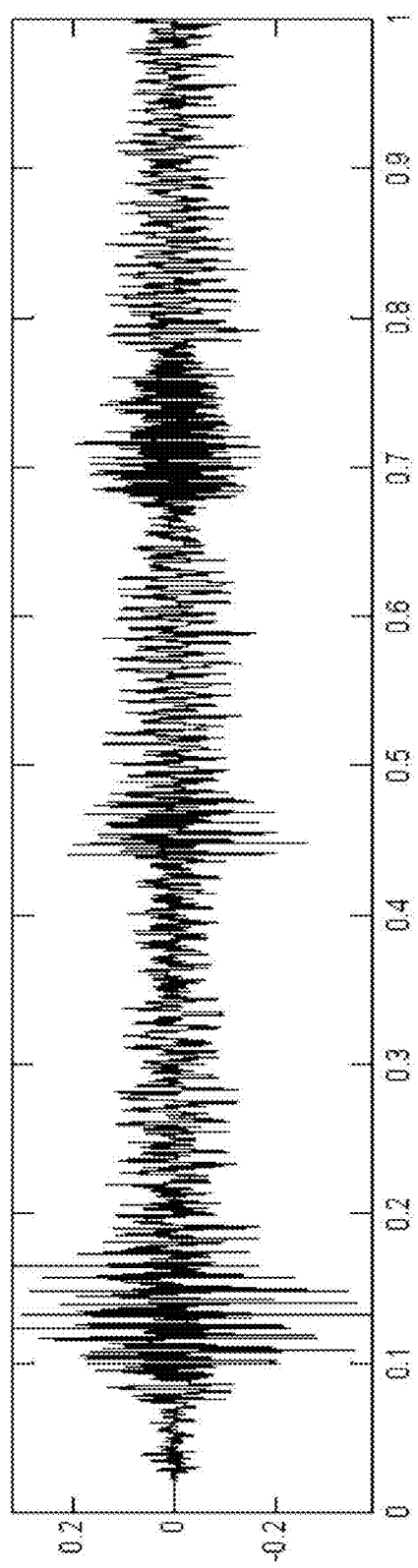
FIG. 3A is an exemplary view of an amplitude of original left channel audio signals.
Figure 3B:
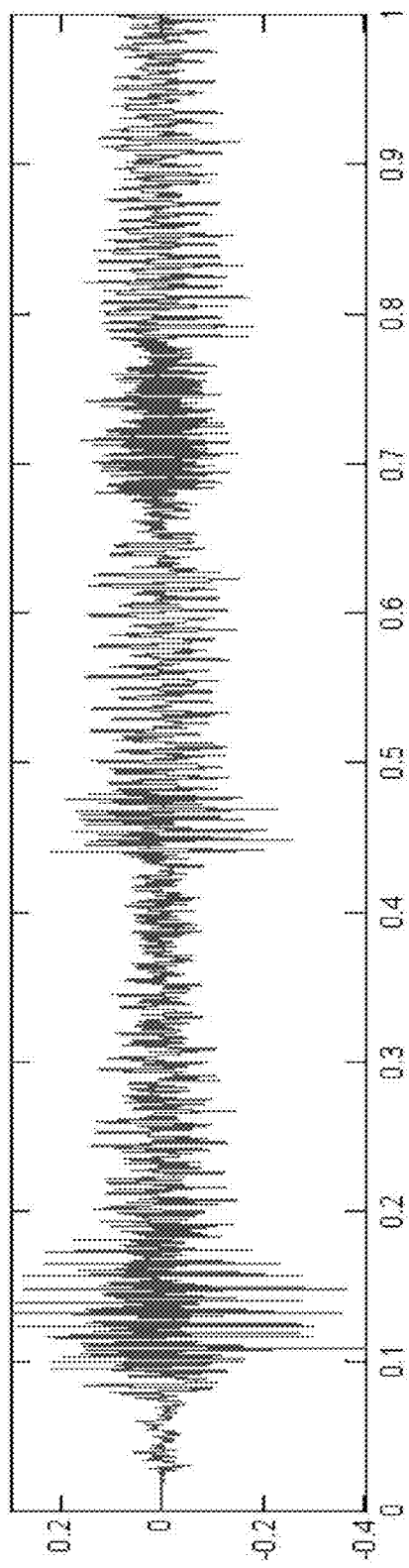
FIG. 3B is an exemplary view of an amplitude of original right channel audio signals.

The audio extraction module 110 extracts left channel audio signal values $LAS_{1-n}$ in a left channel and right channel audio signal values $RAS_{1-n}$ in a right channel from audio signals $AS_{1-n}$ of a stereo audio source of an audio device 10. The audio extraction module 110 then performs a mathematical operation on the left channel audio signal values $LAS_{1-n}$ and the right channel audio signal values $RAS_{1-n}$ to generate absolute values thereof. FIGS. 3A and 3B show amplitudes of original left and right channel audio signals.

The storage module 120 stores the left channel audio signal values $LAS_{1-n}$ and the right channel audio signal values $RAS_{1-n}$ retrieved by the audio extraction module 110 and digital copyright information.

The LPF module 130 filters the left channel audio signal values $LAS_{1-n}$ and the right channel audio signal values $RAS_{1-n}$ to remove noise signals therefrom.

Figure 3C:
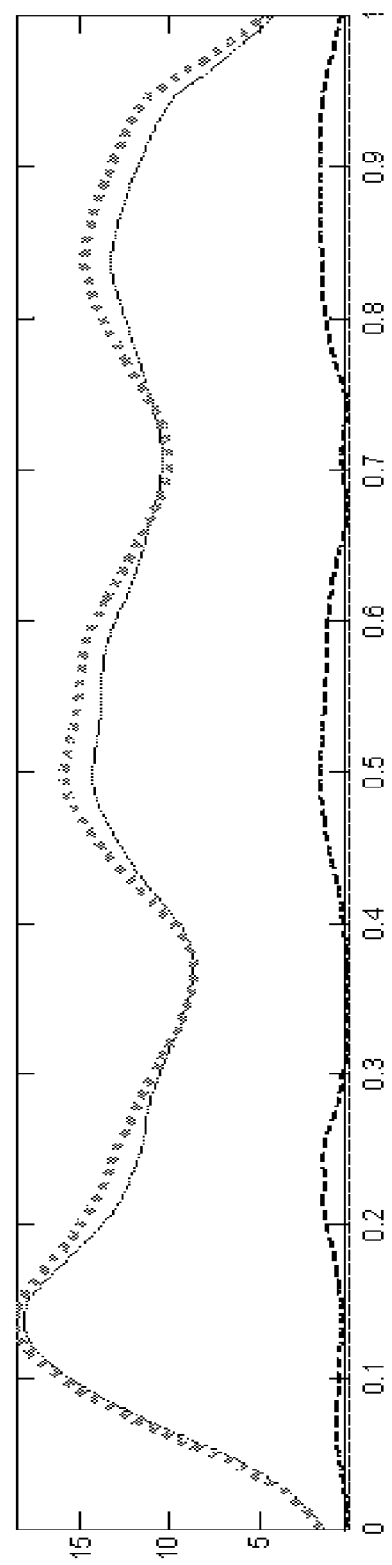
FIG. 3C is an exemplary view of enveloping curves of the left and right channel audio signals and an enveloping difference curve thereof in accordance with the present disclosure.

The audio processing module 140 calculates enveloping values $LE_{1-n}$ for each left channel audio signal value $LAS_n$ and enveloping values $RE_{1-n}$ for each right channel audio signal value $RAS_n$ using a moving average method (MAM) and calculates absolute values of difference values between each left channel audio signal value $LAS_n$ and each right channel audio signal value $RAS_n$ (e.g. $ED_n = ABS(RE_{n-LEn})$). The calculation obtains the difference values of left channel audio signal values $LAS_{1-n}$ and the right channel audio signal values $RAS_{1-n}$ which can be represented by an enveloping difference curve. FIG. 3C shows one embodiment of enveloping curves of the left and right channel audio signals and an enveloping difference curve thereof in accordance with the present disclosure.

Figure 4A:
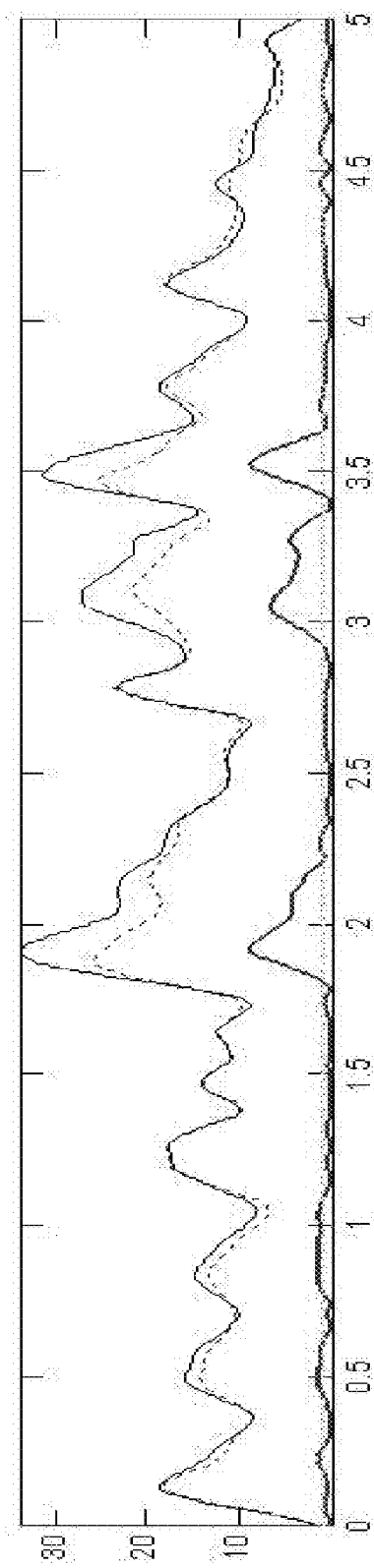
FIG. 4A is an exemplary view showing enveloping curves of the left and right channel audio signals and an enveloping difference curve thereof in accordance with the present disclosure.
Figure 4B:
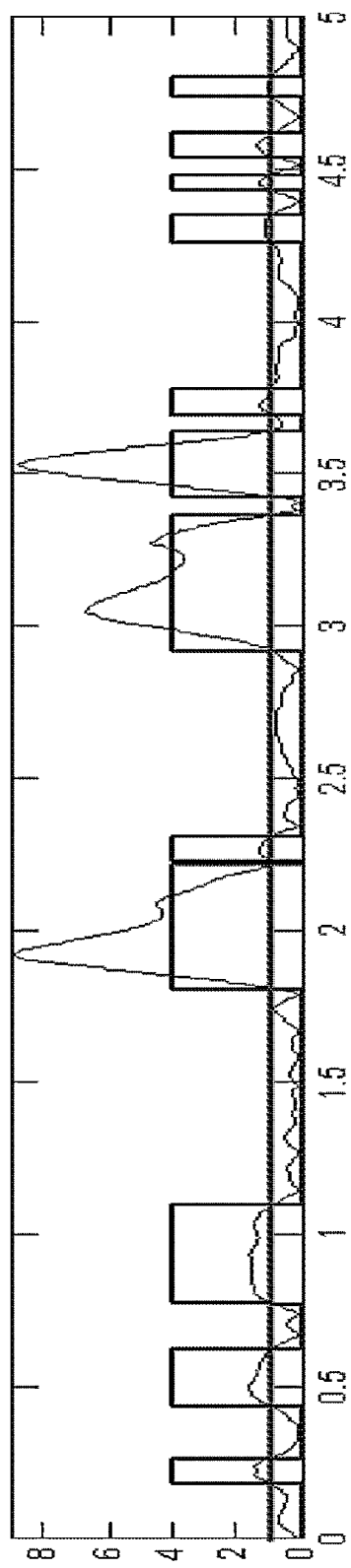
FIG. 4B is an exemplary view showing a number of time slots in accordance with the present disclosure, wherein each enveloping difference value of each time slot exceeds a threshold value.
Figure 4C:
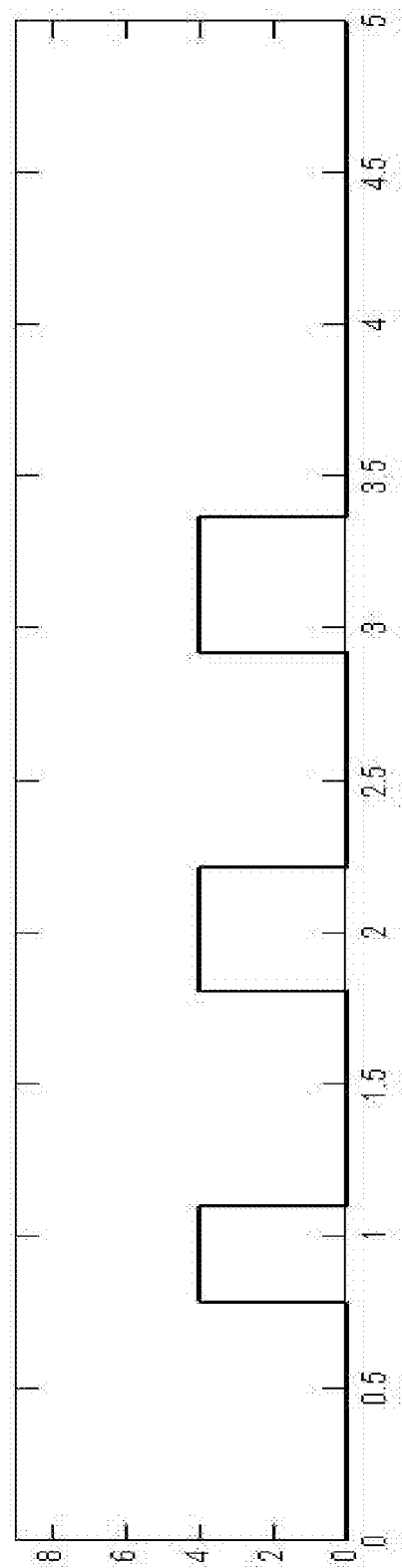
FIG. 4C is an exemplary view showing a number of time slots in accordance with the present disclosure, wherein each enveloping difference value of each time slot exceeds a threshold value and a time slice of each time slot exceeds a preset time.

The detection module 150 detects time slots (e.g. $TS_a$, $TS_b$, ...) which are formed by audio signal values corresponding to enveloping difference values (e.g. $ED_{a1-an}$, $ED_{b1-bn}$, ...) according to the enveloping difference curve shown in FIG. 3C. Each of the enveloping difference values exceeds a threshold value and a time length of each time slot exceeds a preset time. FIG. 4A is a schematic view showing enveloping curves of the left and right channel audio signals and an enveloping difference curve thereof in accordance with the present disclosure. FIG. 4B is a schematic view showing a number of time slots in accordance with the present disclosure, where each enveloping difference value of each time slot exceeds a threshold value (5%, for example). FIG. 4C is a schematic view showing a number of time slots in accordance with the present disclosure, wherein each enveloping difference value of each time slot exceeds a threshold value and a time slice of each time slot exceeds a preset time (0.3 second, for example).

The writing module 160 converts the digital copyright information stored in the storage module 120 to a binary number and writes the binary number in corresponding positions of one time slot involved in the enveloping curve shown in FIG. 4C. For example, the digital copyright information "Foxconn168!!! MBDRD168!!!" is converted into a binary number represented as "01000110011011110111100001100011011011111011011100110111000110001100100110110 00111000001000010010000 010010000100100000100 11010100001001000100010010010 01000100001100010011011000111000000100001100 10000100100001". Each bit of the binary number represents a symbol.

Figure 5A:
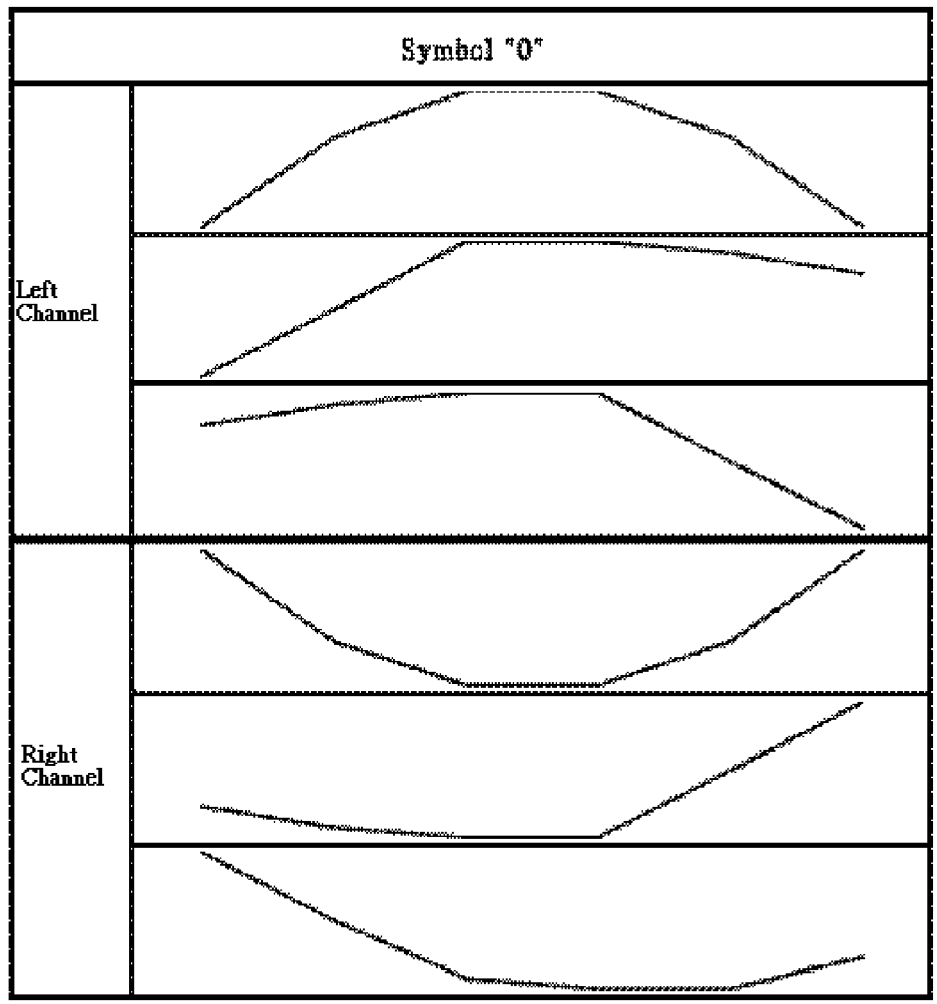
FIG. 5A is an exemplary view of one embodiment of modulation of a waveform formed by left channel audio signals as an inverse U shaped pattern and modulation of a waveform formed by right channel audio signals as a U shaped pattern in accordance with the present disclosure.
Figure 6A:
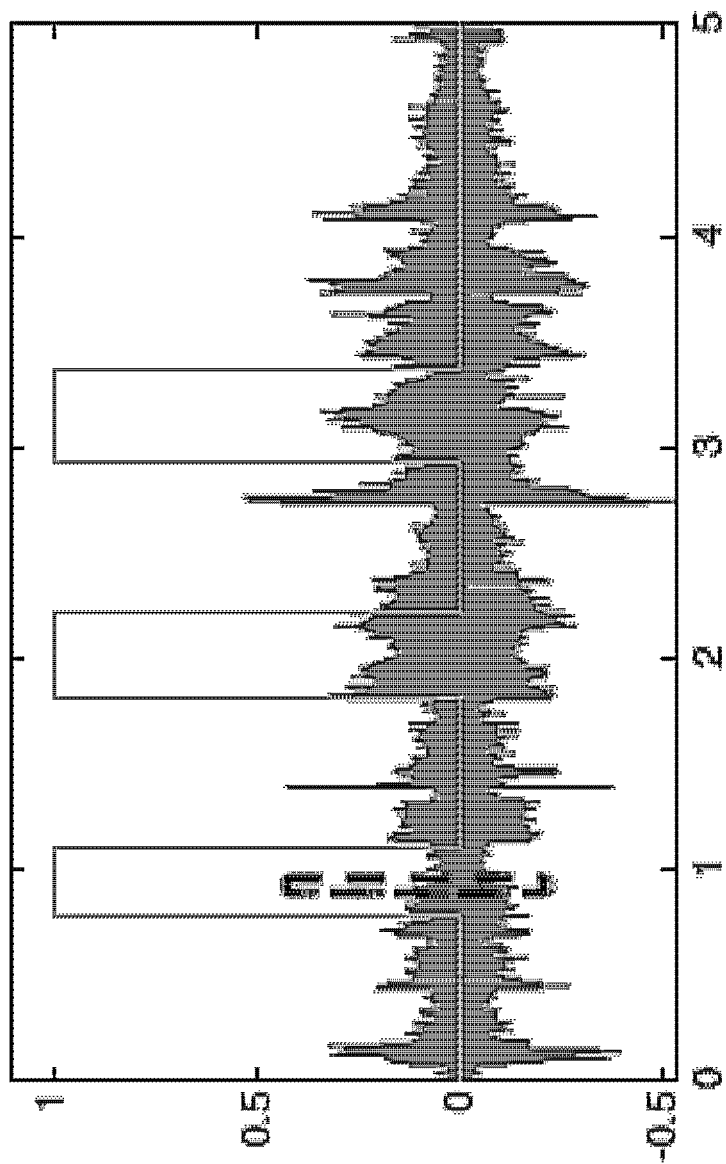
FIG. 6A is an exemplary view of writing symbols in a first time slot of the left channel audio signals in accordance with the present disclosure.

Beginning from a start position of the time slot, if a current symbol to be written is "0", the writing module 160 modulates a waveform, formed by five continuous left channel audio signal values, as an inverse U shaped pattern and modulates a waveform formed by five continuous right channel audio signal values, as a U shaped pattern (as shown in FIG. 5A), and then writes the symbol "0" in a signal position corresponding to the five continuous left channel audio signal values in the first time slot $TS_1$ (as shown in the dotted rectangle in FIG. 6A).

Figure 5B:
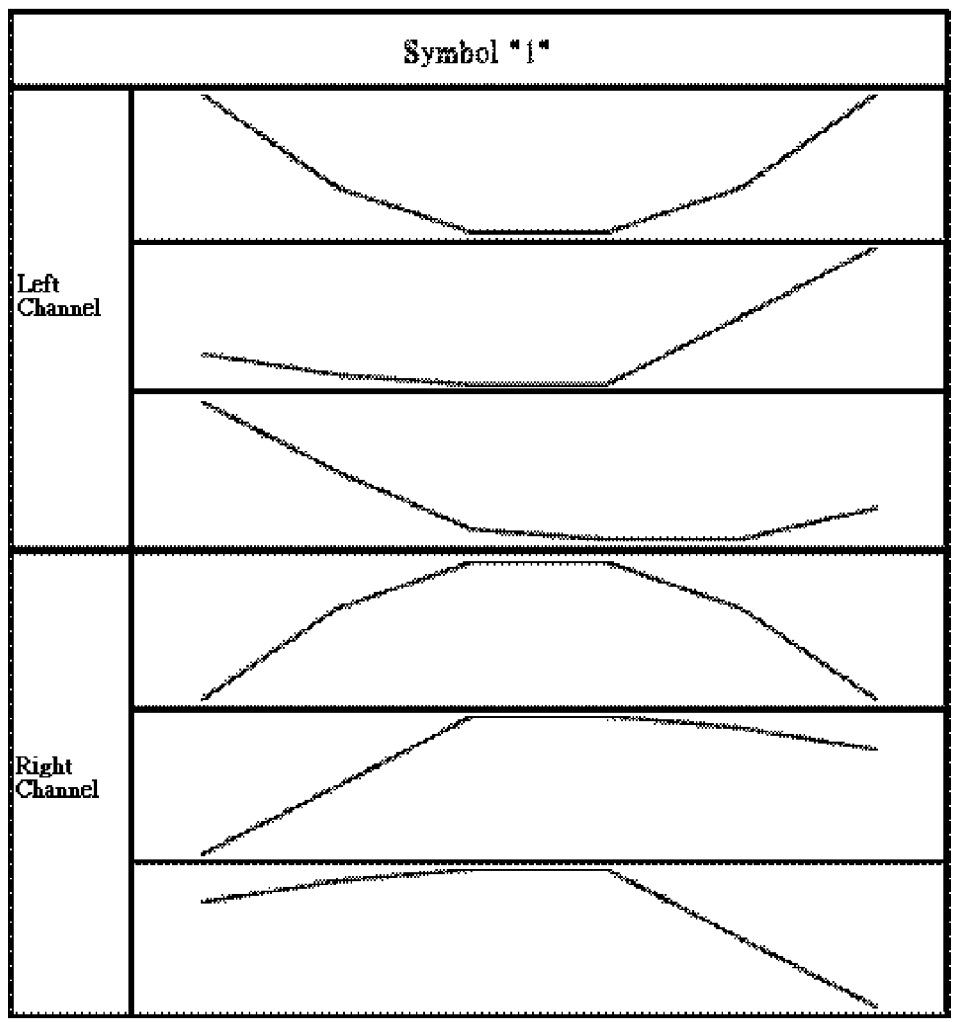
FIG. 5B is an exemplary view of modulation of a waveform formed by left channel audio signals as a U shaped pattern and modulation of a waveform formed by right channel audio signals as an inverse U shaped pattern in accordance with the present disclosure.
Figure 6B:
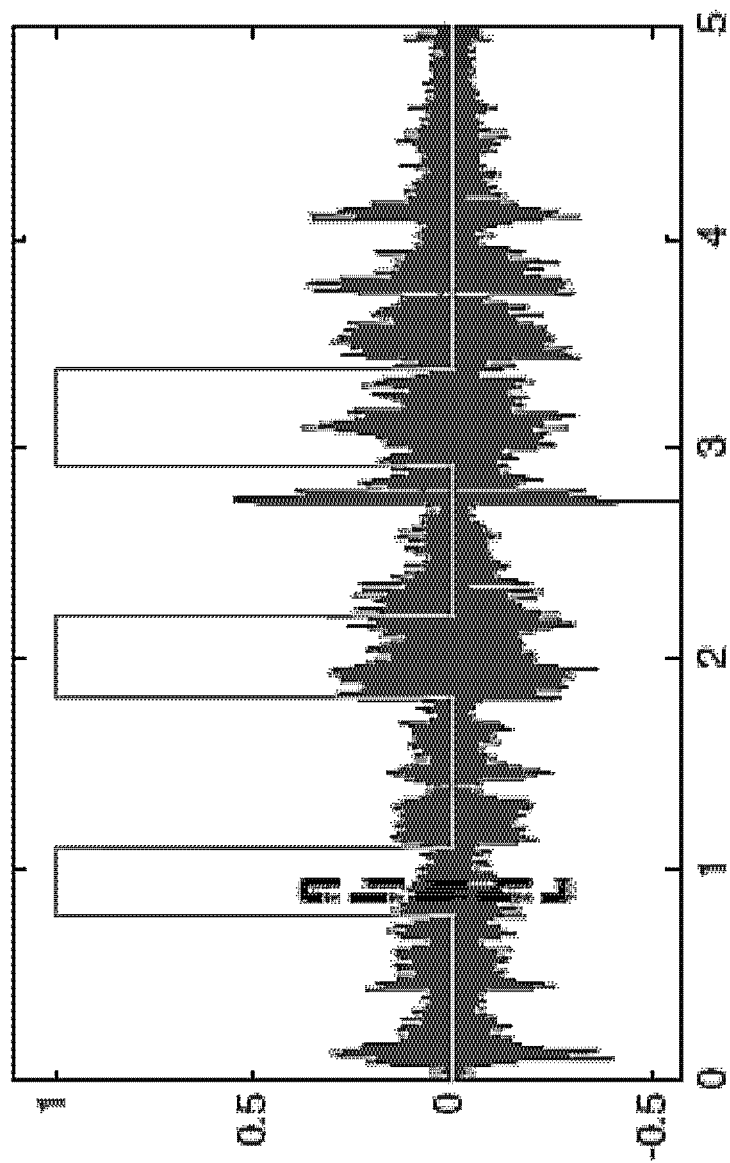
FIG. 6B is an exemplary view of writing symbols in a first time slot of the right channel audio signals in accordance with the present disclosure.

If a current symbol to be written is "1", the writing module 160 modulates a waveform, formed by five continuous left channel audio signal values, as a U shaped pattern and modulates a waveform formed by five continuous right channel audio signal values, as an inverse U shaped pattern (as shown in FIG. 5B), and then writes the symbol "1" in a signal position corresponding to the five continuous right channel audio signal values in the first time slot $TS_1$ (as shown in the dotted rectangle in FIG. 6B).

Figure 7A:
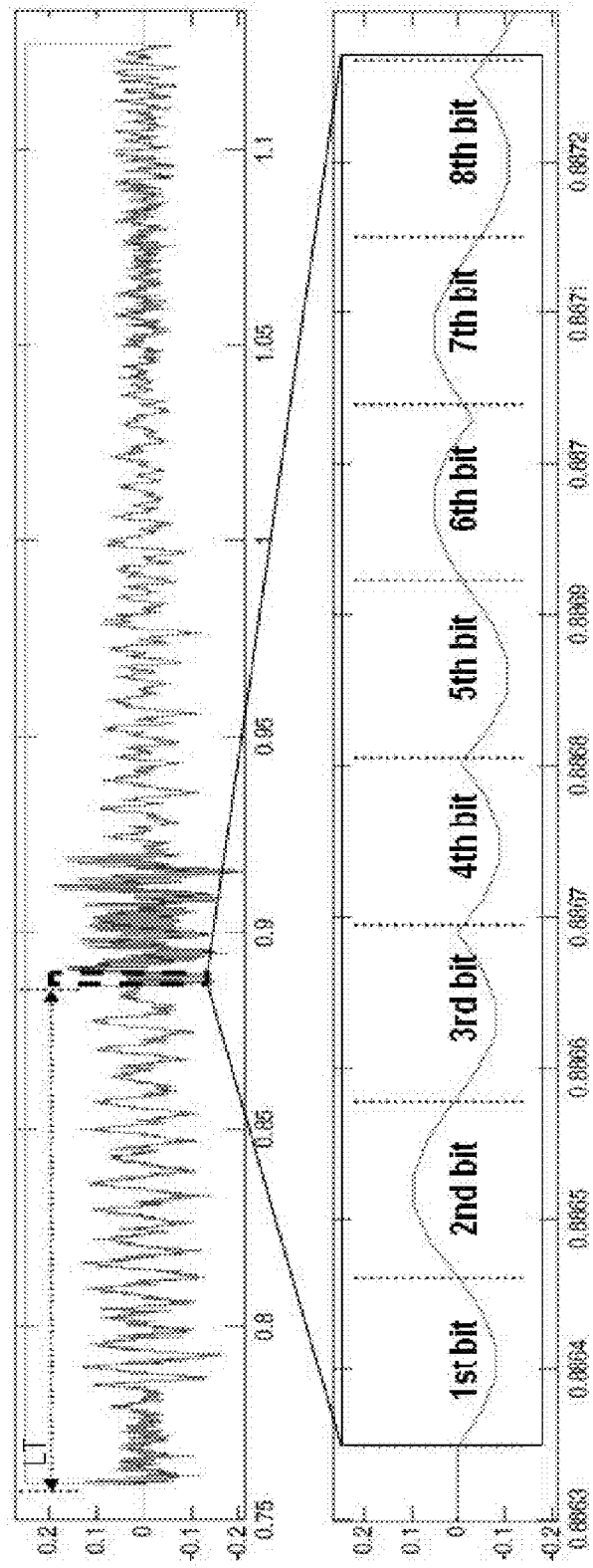
FIG. 7A is an exemplary view of writing digital copyright information in a first available time slot of left channel audio signals and modulating five continuous left channel audio signal values on the basis of a written symbol in accordance with the present disclosure.

FIG. 7A is a schematic view of writing digital copyright information in a first available time slot of left channel audio signals and modulating five continuous left channel audio signal values on the basis of a written symbol in accordance with the present disclosure. The upper section illustrates the first available time slot complying with preset conditions, in which a lead time with 100-200 ms is involved. The lower section illustrates the first byte of the binary number written in the first available time slot, where the symbol "0" is respectively written in the $2^{nd}$, 6th, and 7th bits.

Figure 7B:
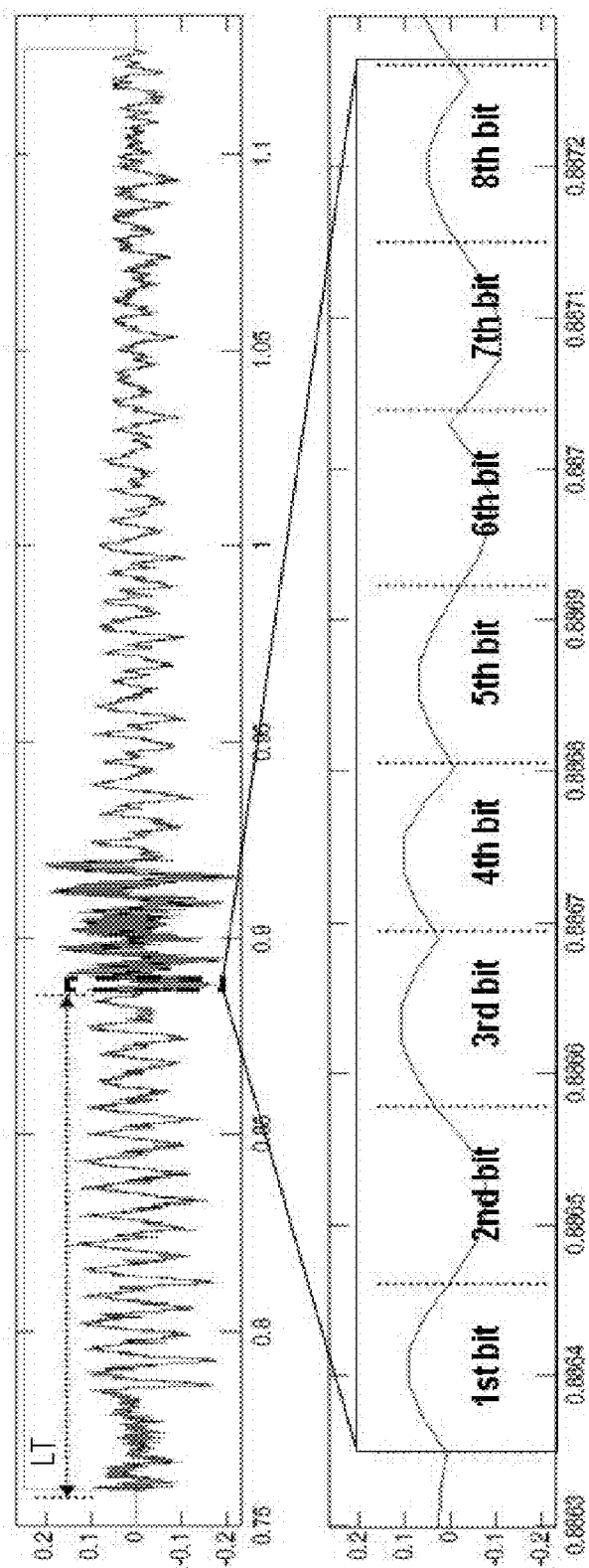
FIG. 7B is an exemplary view of writing digital copyright information in a first available time slot of right channel audio signals and modulating five continuous right channel audio signal values on the basis of a written symbol in accordance with the present disclosure.

FIG. 7B is a schematic view of writing digital copyright information in the first available time slot of right channel audio signals and modulating five continuous right channel audio signal values on the basis of a written symbol in accordance with the present disclosure. The upper section illustrates the first available time slot complying with the preset conditions, in which a lead time with 100-200 ms is involved. The lower section illustrates the first byte of the binary number written in the first available time slot, where the symbol "1" is respectively written in the $1^{st}$, $3^{rd}$, 4-th, 5-th and 8-th bits.

It should be noted that, in another embodiment, the symbol "0" or "1" may also be written in multiple time slots.

The writing module 160 further determines whether the writing for the symbols of the binary number has been completed. If the writing has not been completed, the next symbol is read and written in a corresponding position of the first time slot.

Figure 2:
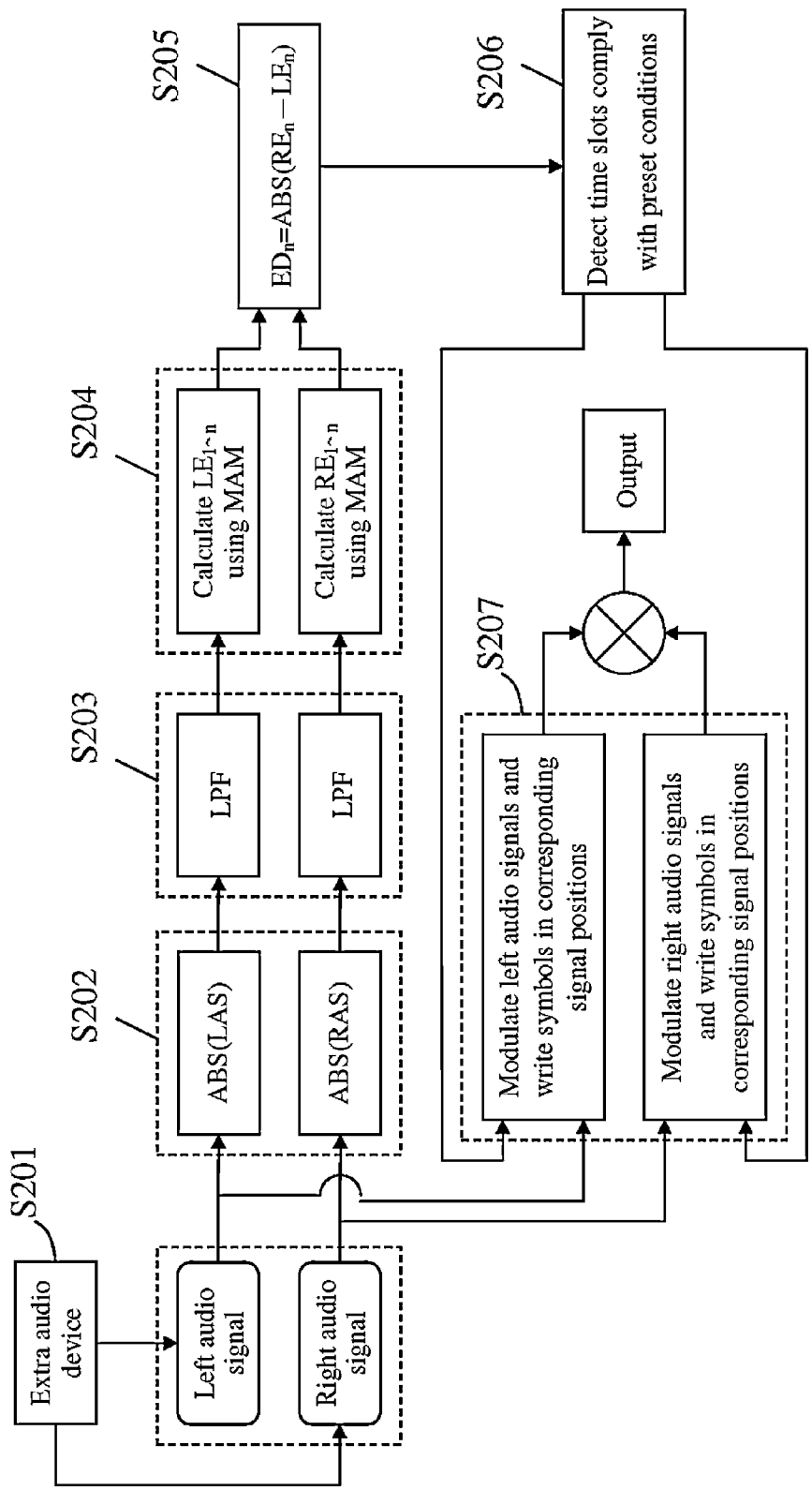
FIG. 2 is a flowchart of one embodiment of a copyright protection method of audio data in accordance with the present disclosure.

FIG. 2 is a flowchart of one embodiment of a copyright protection method of audio data in accordance with the present disclosure.

Left channel audio signal values $LAS_{1-n}$ in a left channel and right channel audio signal values $RAS_{1-n}$ in a right channel are extracted from audio signals $AS_{1-n}$ of a stereo audio source of an audio device (step S201). A mathematical operation is performed on the left channel audio signal values $LAS_{1-n}$ and the right channel audio signal values $RAS_{1-n}$ for generating absolute values thereof (ABS(LAS) & ABS(LAS)) (step S202). The left channel audio signal values $LAS_{1-n}$ and the right channel audio signal values $RAS_{1-n}$ are respectively filtered using a low pass filter to remove noise signals (step S203).

Enveloping values $LE_{1-n}$ for each left channel audio signal value $LAS_n$ and enveloping values $RE_{1-n}$ for each right channel audio signal value $RAS_n$ are calculated using a moving average method (step S204). Absolute values of difference values between each left channel audio signal value $LAS_n$ and each right channel audio signal value $RAS_n$ are calculated (e.g. $ED_n=ABS(RE_n-LE_n)$) (step S205). The described calculation obtains the difference values of left channel audio signal values $LAS_{1-n}$ and the right channel audio signal values $RAS_{1-n}$, which can be represented by an enveloping difference curve.

Time slots (e.g. $TS_a$, $TS_b$, ...) which are formed by audio signal values corresponding to enveloping difference values (e.g. $ED_{a1-an}$, $ED_{b1-bn}$, ...) are detected according to the enveloping difference curve (step S206). Each of the enveloping difference values exceeds a threshold value and a time length of each time slot exceeds a preset time. Digital copyright information is converted into a binary number and written in corresponding positions of one of the detected time slots (step S207).

The writing operation further comprises, if a current symbol to be written is "0", modulation of a waveform, formed by five continuous left channel audio signal values (beginning from a start position of the time slot) as an inverse U shaped pattern and modulation of a waveform formed by five continuous right channel audio signal values, as a U shaped pattern (as shown in FIG. 5A), and then writing the symbol "0" in a signal position corresponding to the five continuous left channel audio signal values in the first time slot $TS_1$ (as shown in the dotted rectangle in FIG. 6A).

If a current symbol to be written is "1", the writing operation further modulates a waveform, formed by five continuous left channel audio signal values, as a U shaped pattern and modulates a waveform formed by five continuous right channel audio signal values, as an inverse U shaped pattern (as shown in FIG. 5B), and then writes the symbol "1" in a signal position corresponding to the five continuous right channel audio signal values in the first time slot $TS_1$ (as shown by the dotted rectangle in FIG. 6B).

Figure 8A:
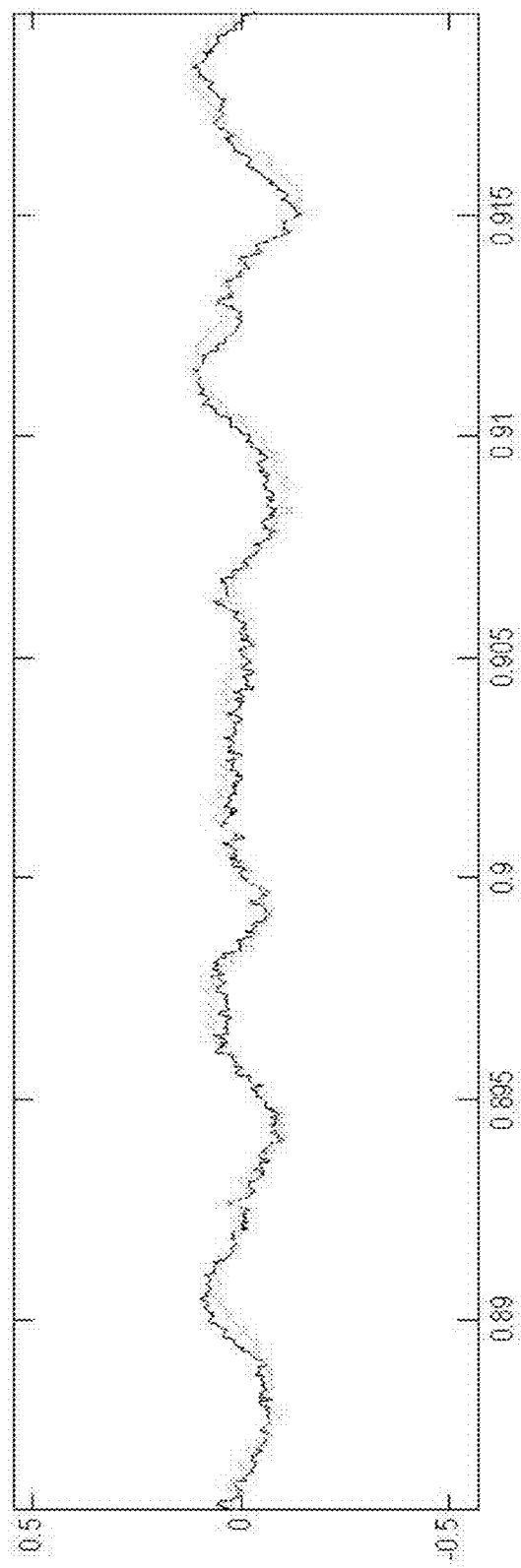
FIGS. 8A and 8B are exemplary views showing a comparison between original audio signals and audio signals with inserted digital copyright information in accordance with the present disclosure.
Figure 8B:
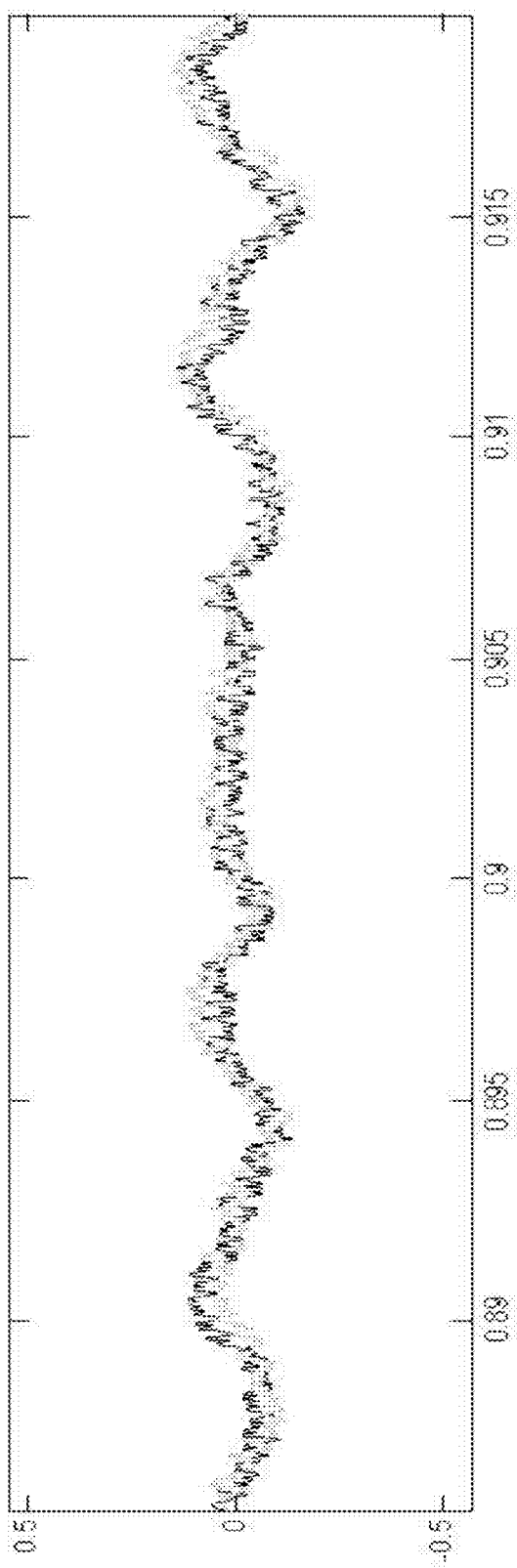
Figure 9A:
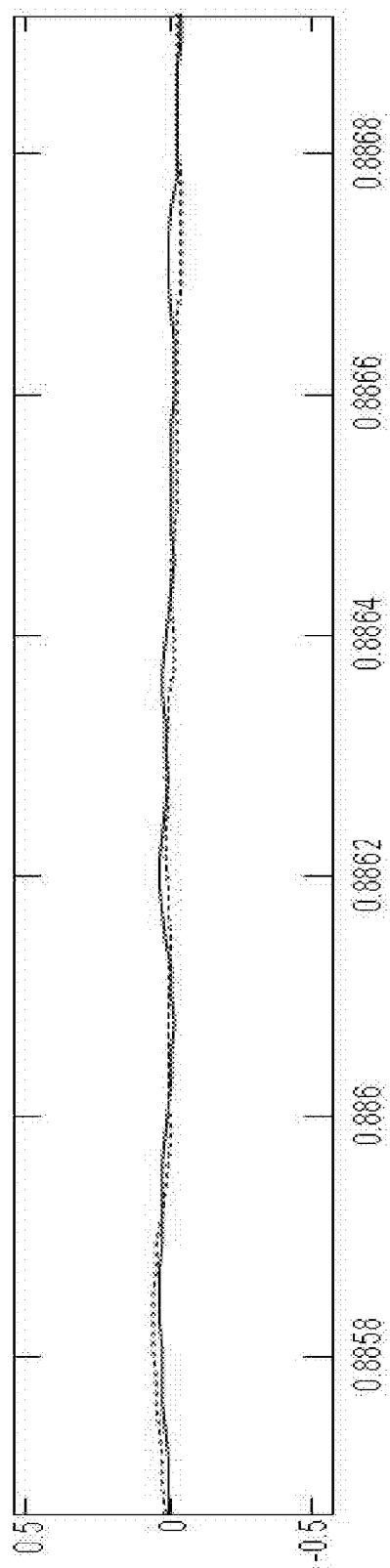
Figure 9B:
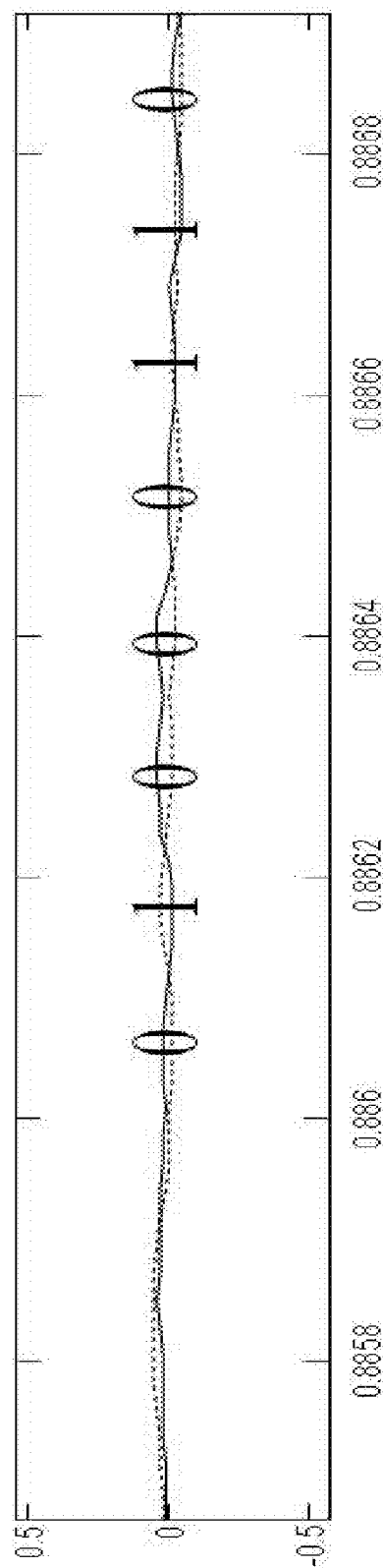
Figure 9C:
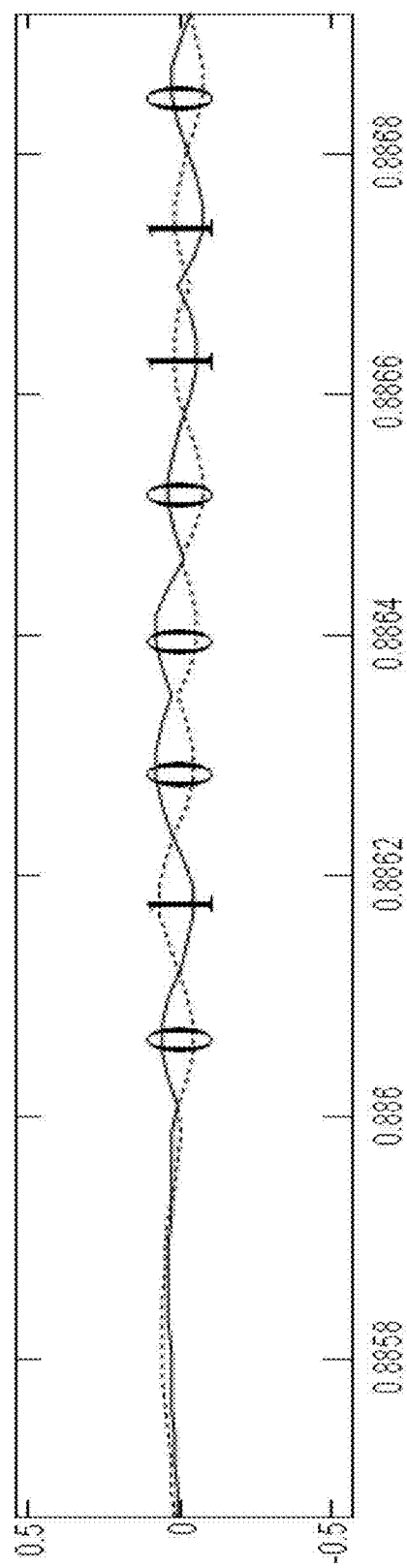
Figure 9D:
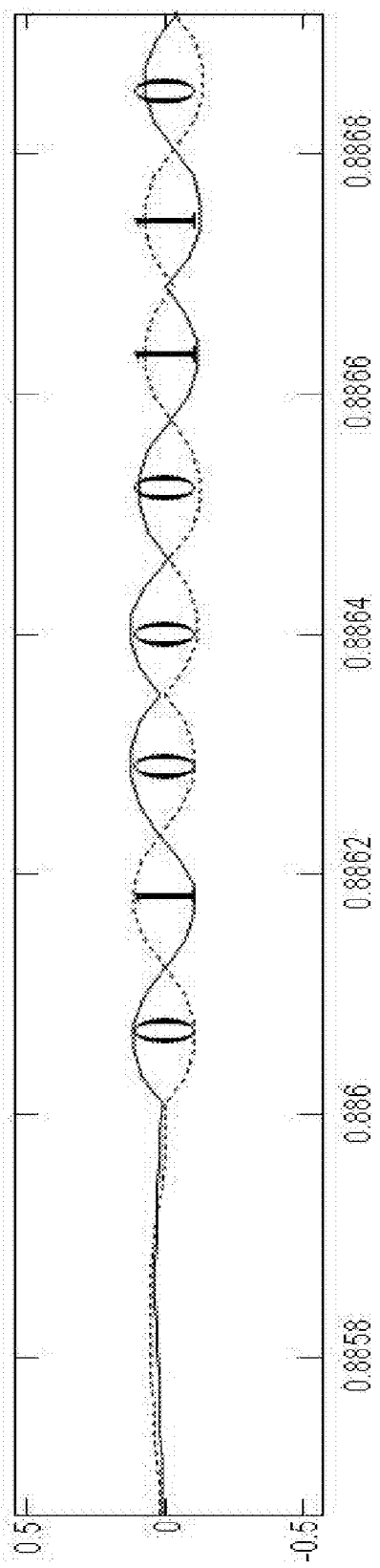

FIGS. 8A and 8B are schematic views showing a comparison between original audio signals and audio signals with inserted digital copyright information ("Foxconn168!!! MBDRD168!!!", for example) in accordance with the present disclosure. FIGS. 9A to 9E are schematic views of embodiments respectively showing audio signals with inserted digital copyright information modulated by different degrees of an amplitude in accordance with the present disclosure, where FIG. 9A shows original left and right channel audio signals.

Figure 10A:
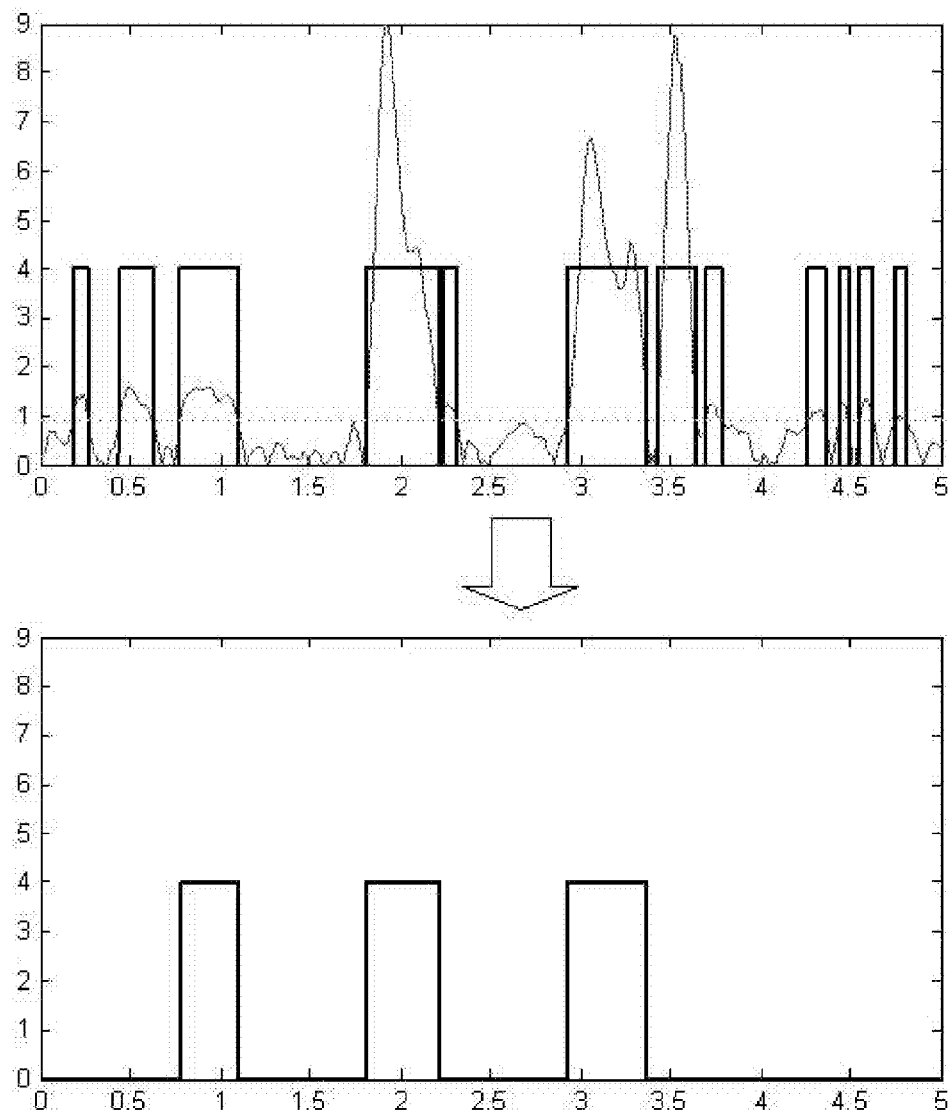
FIGS. 10A and 10B are exemplary views showing respective comparisons between enveloping values of original left/right channel audio signals and that of left/right channel audio signals with inserted digital copyright information in accordance with the present disclosure.
Figure 10B:
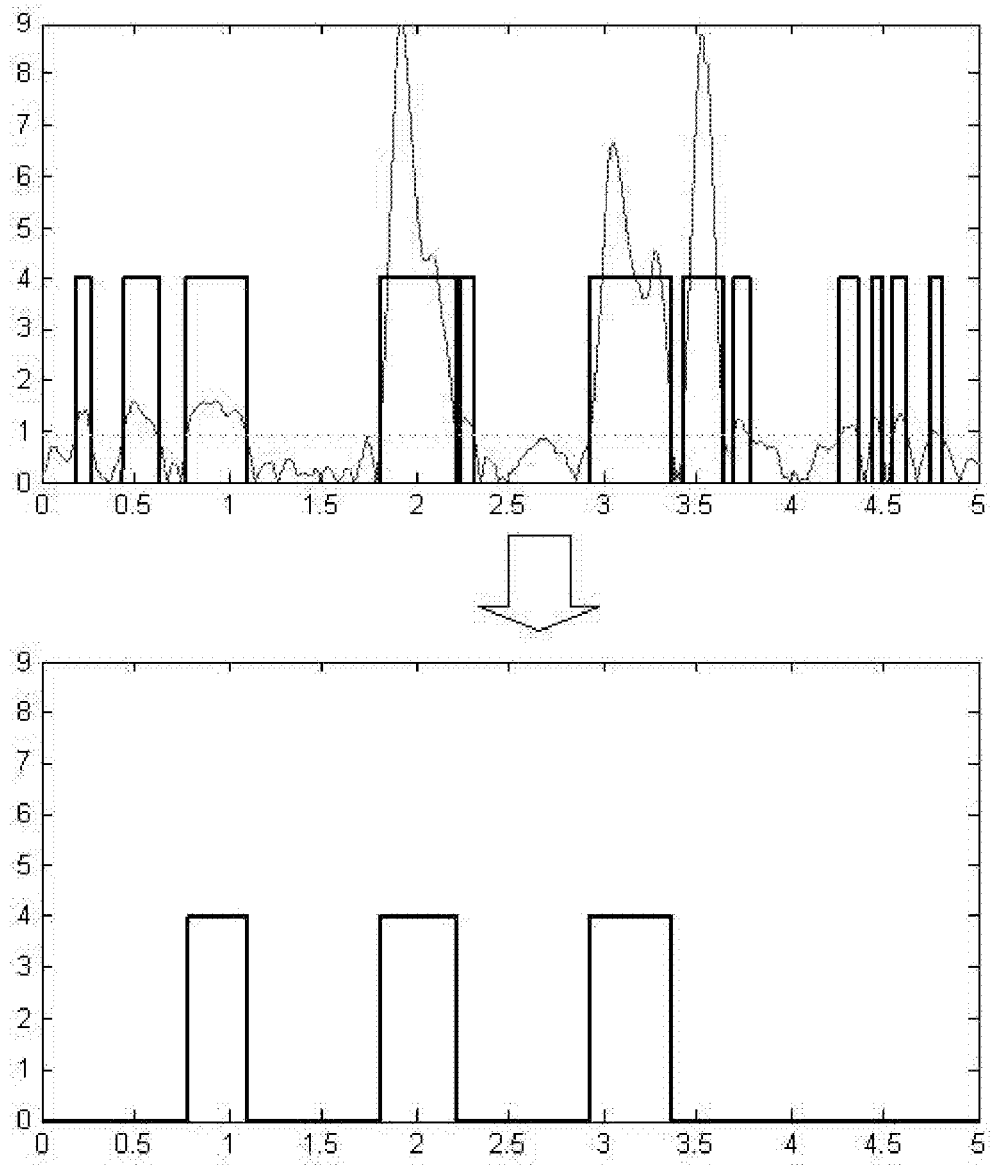
Figure 11A:
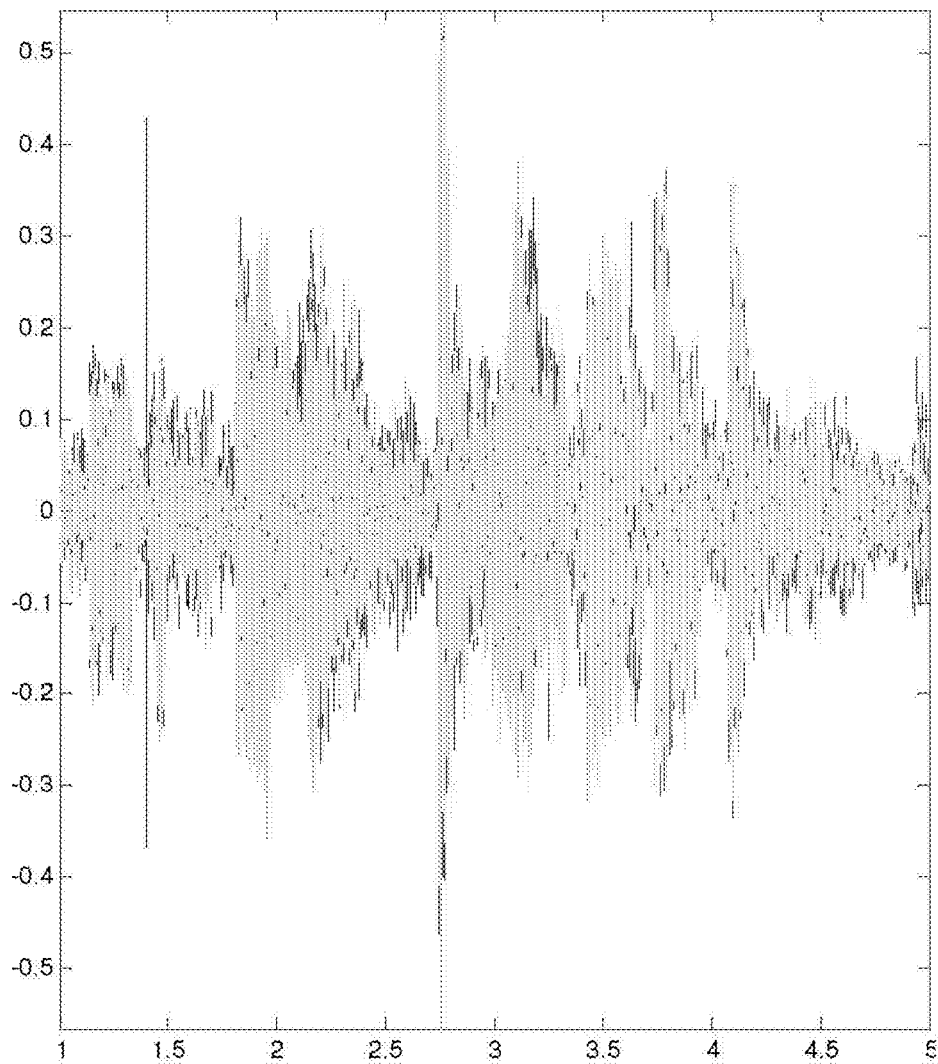
FIGS. 11A and 11B are exemplary views showing respective comparisons between enveloping values of original left/right channel audio signals and that of left/right channel audio signals with inserted digital copyright information in accordance with the present disclosure.
Figure 11B:
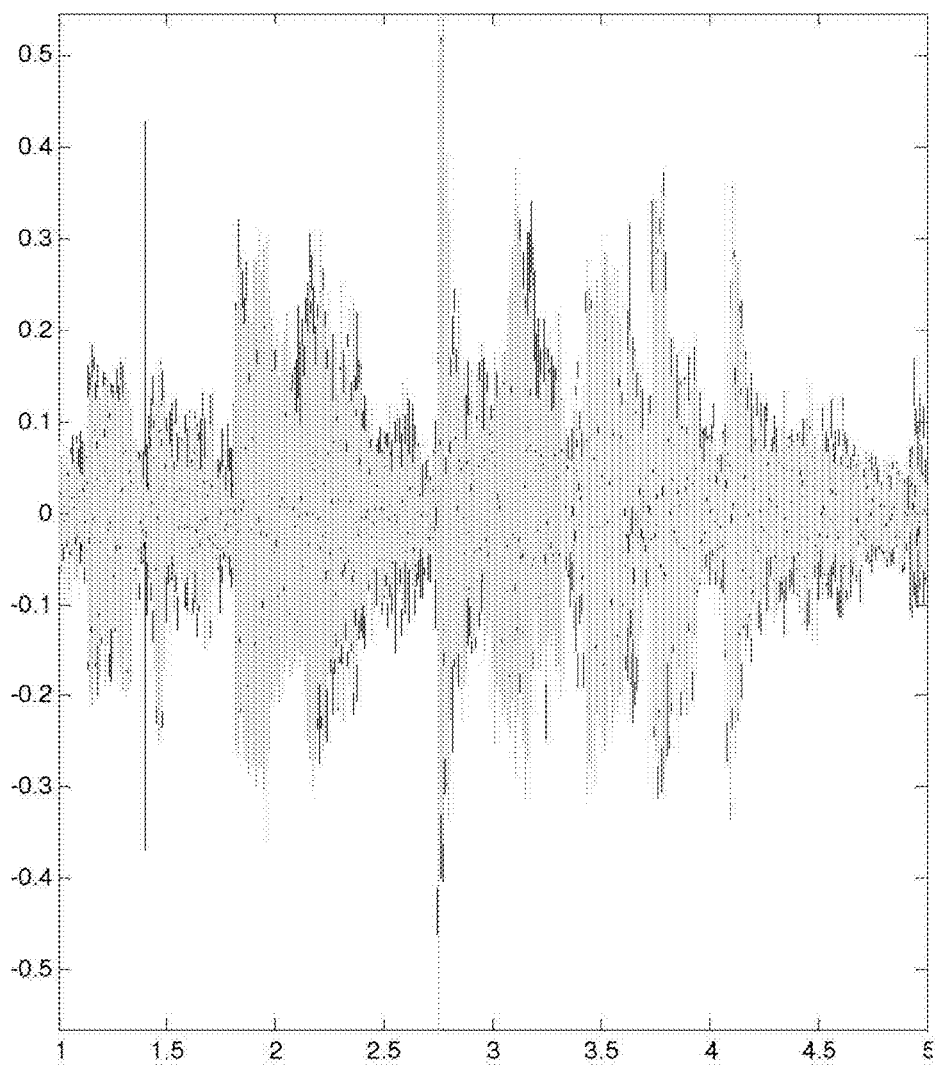

FIGS. 10A and 10B are schematic views showing respective comparisons between enveloping values of original left/right channel audio signals and that of left/right channel audio signals with inserted digital copyright information in accordance with the present disclosure. FIGS. 11A and 11B are schematic views of another embodiment showing respective comparisons between enveloping values of original left/right channel audio signals and that of left/right channel audio signals with inserted digital copyright information in accordance with the present disclosure.

Referring to FIGS. 10A and 10B, an embodiment of the electronic device and copyright protection method of the present disclosure writes messages with different phases in left and right channel audio signals for increasing enveloping difference values therebetween and makes certain that an enveloping value of a time slot including the written messages exceeds the described threshold value. In addition, compared with original audio data, the audio data processed by the electronic device 100 has a minor variation, which means the digital copyright information barely affects the audio data. Thus, the quality of the audio data is unaffected, the copyright of audio data is protected, and the audio data can be easily tracked.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A copyright protection method of audio data of an electronic device, the method comprising:
    extracting a plurality of left channel audio signal values and a plurality of right channel audio signal values from a plurality of audio signals of an audio source of the electronic device;
    calculating a plurality of difference values between each of the left channel audio signal values and each of the corresponding right channel audio signal values;
    determining a time slot which is formed by a plurality of first audio signal values corresponding to a plurality of first difference values among the difference values, wherein each of the first difference values exceeds a threshold value and a time length of the time slot exceeds a preset time;
    respectively modulating a plurality of first left channel audio signal values and a plurality of first right channel audio signal values for the first audio signal values; and
    writing digital copyright information in corresponding positions of the time slot according to the modulating result.

2. The copyright protection method of audio data as claimed in claim 1, wherein the step of calculating the difference values of the left and right channel audio signal values further comprises:
    calculating a plurality of first enveloping values for each of the left channel audio signal values;
    calculating a plurality of second enveloping values for each of the right channel audio signal values; and
    calculating a plurality of enveloping difference values corresponding to the audio signal values on the basis of the first and second enveloping values.

3. The copyright protection method of audio data as claimed in claim 2, further comprising calculating the first and second enveloping values using a moving average method.

4. The copyright protection method of audio data as claimed in claim 1, wherein the digital copyright information is a binary number including a plurality of bits, each representing a symbol, wherein the step of modulating the first left and right channel audio signal values further comprises:
   determining whether a current symbol to be written is "0" or "1";
   beginning from a start position of the time slot, modulation of a waveform, formed by five continuous left channel audio signal values, as an inverse U shaped pattern and modulation of a waveform formed by five continuous right channel audio signal values, as a U shaped pattern, if the current symbol to be written is "0"; and
   modulation of a waveform, formed by five continuous left channel audio signal values, as a U shaped pattern and modulation of a waveform formed by five continuous right channel audio signal values, as an inverse U shaped pattern, if the current symbol to be written is "1".

5. The copyright protection method of audio data as claimed in claim 4, wherein the step of writing the digital copyright information in the corresponding positions of the time slot further comprises:
   if the symbol to be written is "0", writing the symbol "0" in a first signal position corresponding to the five continuous left channel audio signal values; and
   if the symbol to be written is "1", writing the symbol "1" in a second signal position corresponding to the five continuous left channel audio signal values.

6. A copyright protection method of audio data of an electronic device, the method comprising:
   extracting a plurality of left channel audio signal values and a plurality of right channel audio signal values from a plurality of audio signals of an audio source of the electronic device;
   calculating a plurality of first enveloping values for each of the left channel audio signal values and a plurality of second enveloping values for each of the right channel audio signal values;
   calculating a plurality of enveloping difference values according to the first and second enveloping values;
   determining a time slot according to the enveloping difference values, wherein the time slot is formed by a plurality of first audio signal values corresponding to a plurality of first enveloping difference values among the enveloping difference values, wherein each of the first enveloping difference values exceeds a threshold value and a time length of the time slot exceeds a preset time;
   respectively modulating a plurality of first left channel audio signal values and a plurality of first right channel audio signal values for the first audio signal values; and
   writing digital copyright information in corresponding positions of the time slot according to the modulating result.

7. The copyright protection method of audio data as claimed in claim 6, wherein the digital copyright information is a binary number including a plurality of bits and each bit of the binary number represents a symbol, wherein the step of modulating the first left and right channel audio signal values further comprises:
   determining whether a current symbol to be written is "0" or "1";
   beginning from a start position of the time slot, modulation of a waveform, formed by five continuous left channel audio signal values, as an inverse U shaped pattern and modulation of a waveform formed by five continuous right channel audio signal values, as a U shaped pattern, if the current symbol to be written is "0"; and
   modulation of a waveform, formed by five continuous left channel audio signal values, as a U shaped pattern and modulation of a waveform formed by five continuous right channel audio signal values, as an inverse U shaped pattern, if the current symbol to be written is "1".

8. The copyright protection method of audio data as claimed in claim 7, wherein the step of writing the digital copyright information in the corresponding positions of the time slot further comprises:
   if the symbol to be written is "0", writing the symbol "0" in a first signal position corresponding to the five continuous left channel audio signal values; and
   if the symbol to be written is "1", writing the symbol "1" in a second signal position corresponding to the five continuous left channel audio signal values.

9. The copyright protection method of audio data as claimed in claim 6, further comprising calculating the first and second enveloping values using a moving average method.

10. An electronic device, comprising:
    an audio source;
    an audio extraction module to extract a plurality of left channel audio signal values and a plurality of right channel audio signal values from a plurality of audio signals of the audio source of the electronic device;
    an audio processing module to calculate a plurality of difference values between each of the left channel audio signal values and each of the corresponding right channel audio signal values;
    a detection module to determine a time slot which is formed by a plurality of first audio signal values corresponding to a plurality of first difference values among the difference values, wherein each of the first difference values exceeds a threshold value and a time length of the time slot exceeds a preset time; and
    a writing module to respectively modulate a plurality of first left channel audio signal values and a plurality of first right channel audio signal values for the first audio signal values, and write digital copyright information in corresponding positions of the time slot according to the modulating result.

11. The electronic device as claimed in claim 10, wherein the audio processing module further calculates a plurality of first enveloping values for each of the left channel audio signal values, calculates a plurality of second enveloping values for each of the right channel audio signal values, and calculates a plurality of enveloping difference values corresponding to the audio signal values on the basis of the first and second enveloping values.

12. The electronic device as claimed in claim 11, where the audio processing module further calculates the first and second enveloping values using a moving average method.

13. The electronic device as claimed in claim 10, wherein the digital copyright information is a binary number including a plurality of bits and each bit of the binary number represents a symbol, the writing module further determines whether a current symbol to be written is "0" or "1", beginning from a start position of the time slot, modulates a waveform, formed by five continuous left channel audio signal values, as an inverse U shaped pattern and modulates a waveform formed by five continuous right channel audio signal values, as a U shaped pattern, if the current symbol to be written is "0", and, modulates a waveform, formed by five continuous left channel audio signal values, as a U shaped pattern and modulates a waveform formed by five continuous right channel audio signal values, as an inverse U shaped pattern, if the current symbol to be written is "1".

14. The electronic device as claimed in claim 13, wherein writing module further, if the symbol to be written is "0", writes the symbol "0" in a first signal position corresponding to the five continuous left channel audio signal values, and, if the symbol to be written is "1", writes the symbol "1" in a second signal position corresponding to the five continuous left channel audio signal values.

15. An electronic device, comprising:
    an audio source;
    an audio extraction module to extract a plurality of left channel audio signal values and a plurality of right channel audio signal values from a plurality of audio signals of the audio source of the electronic device;
    an audio processing module to calculate a plurality of first enveloping values for each of the left channel audio signal values and a plurality of second enveloping values for each of the right channel audio signal values;
    a detection module to calculate a plurality of enveloping difference values according to the first and second enveloping values and determines a time slot according to the enveloping difference values, wherein the time slot is formed by a plurality of first audio signal values corresponding to a plurality of first enveloping difference values among the enveloping difference values, wherein each of the first enveloping difference values exceeds a threshold value and a time length of the time slot exceeds a preset time;
    a writing module to respectively modulate a plurality of first left channel audio signal values and a plurality of first right channel audio signal values for the first audio signal values, and write digital copyright information in corresponding positions of the time slot according to the modulating result.

16. The electronic device as claimed in claim 15, wherein the digital copyright information is a binary number including a plurality of bits and each bit of the binary number represents a symbol, the writing module further determines whether a current symbol to be written is "0" or "1", beginning from a start position of the time slot, modulates a waveform, formed by five continuous left channel audio signal values, as an inverse U shaped pattern and modulates a waveform formed by five continuous right channel audio signal values, as a U shaped pattern, if the current symbol to be written is "0", and, modulates a waveform, formed by five continuous left channel audio signal values, as a U shaped pattern and modulates a waveform formed by five continuous right channel audio signal values, as an inverse U shaped pattern, if the current symbol to be written is "1".

17. The electronic device as claimed in claim 7, wherein the writing module further, if the symbol to be written is "0", writes the symbol "0" in a first signal position corresponding to the five continuous left channel audio signal values, and, if the symbol to be written is "1", writes the symbol "1" in a second signal position corresponding to the five continuous left channel audio signal values.

18. The electronic device as claimed in claim 15, the audio processing module further calculates the first and second enveloping values using a moving average method.

* * * * *